US007558713B2

(12) United States Patent
Kumar

(10) Patent No.: US 7,558,713 B2
(45) Date of Patent: Jul. 7, 2009

(54) METHOD FOR AUTOMATING HYDRAULIC MANIFOLD DESIGN

(75) Inventor: Sumit Kumar, New Delhi (IN)

(73) Assignee: Vest, Inc., Troy, MI (US)

( * ) Notice: Subject to any disclaimer, the term of this patent is extended or adjusted under 35 U.S.C. 154(b) by 434 days.

(21) Appl. No.: 11/377,538

(22) Filed: Mar. 16, 2006

(65) Prior Publication Data

US 2007/0219658 A1 Sep. 20, 2007

(51) Int. Cl.
*G06F 9/455* (2006.01)

(52) U.S. Cl. .......................... 703/7; 700/98; 123/90.13; 510/185

(58) Field of Classification Search ..................... 703/7; 70/97, 98; 417/307; 123/198 F, 90.12, 184.56, 123/198; 510/185; 303/48; 60/456; 264/328.8; 180/69.6; 700/97, 98
See application file for complete search history.

(56) References Cited

U.S. PATENT DOCUMENTS 5,552,995 A * 9/1996 Sebastian ..................... 700/97
6,170,587 B1 * 1/2001 Bullock ..................... 180/69.6
6,408,217 B1 * 6/2002 Nishiyama et al. ............ 700/97
6,645,417 B1 * 11/2003 Grove ..................... 264/328.8
2002/0124818 A1 * 9/2002 Cristiani et al. .......... 123/90.12
2003/0143085 A1 * 7/2003 Fletcher et al. ............. 417/307
2003/0158061 A1 * 8/2003 Ahmadi et al. .............. 510/185
2003/0188710 A1 * 10/2003 Parker et al. ............. 123/198 F
2004/0035383 A1 * 2/2004 Ward et al. ............. 123/184.56
2004/0158340 A1 * 8/2004 Fischer et al. ................. 700/97
2005/0288807 A1 * 12/2005 Tooman et al. ................ 700/97
2006/0021340 A1 * 2/2006 Vigholm et al. ............... 60/456
2007/0176485 A1 * 8/2007 Daigre ........................ 303/48

OTHER PUBLICATIONS

Design Automation of Hydraulic Manifolds, published on Mar. 17, 2005 in the United States by P. V. M. Rao, PhD, Vest, Inc., New Delhi, India.
Compact Design of Hydraulic Manifolds, published on Mar. 17, 2005 in the United States by P.V.M. Rao, PhD, Vest, Inc., New Delhi, India.

* cited by examiner

*Primary Examiner*—Paul L Rodriguez
*Assistant Examiner*—Kandasamy Thangavelu
(74) *Attorney, Agent, or Firm*—Young Basile

(57) ABSTRACT

A method for automating the manifold design process based on a hydraulic circuit cavity geometry and manifold design parameters successively merges stored design patterns, including orientations and connectivity data of each cavity into an evolving manifold topology. Cross-drill connections are added to the topology. A complete 3-D manifold model is then exported through a CAD program.

15 Claims, 22 Drawing Sheets

| | A | B | C | D |
|---|---|---|---|---|
| A | - | SA | PA | PA |
| B | SA | - | PA | PA |
| C | PA | PA | - | SA, OA |
| D | PA | PA | SA, OA | - |

| | A | B | C | D |
|---|---|---|---|---|
| *A* | - | 0 | 1 | 1 |
| *B* | 0 | - | 1 | 1 |
| *C* | 3 | 3 | - | 0 |
| D | 2 | 2 | 0 | - |

| AB | BC | AC |
|---|---|---|
| SA | SA | SA/SN |
| SA | SN | SA/SN |
| SA | OC | OA |
| SA | OA | OC/OA /ON |
| SA | ON | OA /ON |
| SA | PA | PA/PN |
| SA | PN | PA/PN |
| SN | SN | SA/SN |
| SN | OC | ON |
| SN | OA | OA /ON |
| SN | ON | OC/OA /ON |
| SN | PA | PN |
| SN | PN | PA/PN |
| OC | OC | **Conflict** |
| OC | OA | SA |
| OC | ON | SN |
| OC | PA | PA |
| OC | PN | PN |
| OA | OA | SA/SN |
| OA | ON | SA/SN |
| OA | PA | PA/PN |
| OA | PN | PA/PN |
| ON | ON | SA/SN |
| ON | PA | PN |
| ON | PN | PA/PN |
| PA | PA | PA/PN/ OC/OA / SA |
| PA | PN | PA/PN/OA/ON/SA/SN |
| PN | PN | PA/N, OA1/A2/N, SA/N |

*Figure 10*

| | A | B | X1 | X2 |
|---|---|---|---|---|
| A | - | SA | PA | PA |
| B | SA | - | PA | PA |
| X1 | PA | PA | - | OA |
| X2 | PA | PA | OA | - |

Orientation Matrix

| | A | B | X1 | X2 |
|---|---|---|---|---|
| A | - | 0 | 1 | 1 |
| B | 0 | - | 1 | 1 |
| X1 | 1 | 1 | - | 0 |
| X2 | 2 | 2 | 0 | - |

Connectivity Matrix

Figure 11(a)

| | B | C | X3 |
|---|---|---|---|
| B | - | SA | PA |
| C | SA | - | PA |
| X3 | PA | PA | - |

Orientation Matrix

| | B | C | X3 |
|---|---|---|---|
| B | - | 0 | 1 |
| C | 0 | - | 1 |
| X3 | 2 | 2 | - |

Connectivity Matrix

Figure 11(b)

| | A | B | C | X1 | X2 | X3 |
|---|---|---|---|---|---|---|
| A | - | SA | ALL | PA | PA | ALL |
| B | SA | - | SA | PA | PA | PA |
| C | ALL | SA | - | ALL | ALL | PA |
| X1 | PA | PA | ALL | - | OA | ALL |
| X2 | PA | PA | ALL | OA | - | ALL |
| X3 | ALL | PA | PA | ALL | ALL | - |

Orientation Matrix

Figure 11(c)

| | A | B | C | X1 | X2 | X3 |
|---|---|---|---|---|---|---|
| A | - | 0 | 0 | 1 | 1 | 0 |
| B | 0 | - | 0 | 1 | 1 | 1 |
| C | 0 | 0 | - | 0 | 0 | 1 |
| X1 | 1 | 1 | 0 | - | 0 | 0 |
| X2 | 2 | 2 | 0 | 0 | - | 0 |
| X3 | 0 | 2 | 2 | 0 | 0 | - |

Connectivity Matrix

Figure 11(d)

| | A | B | C | X1 | X2 | X3 |
|---|---|---|---|---|---|---|
| A | - | SA | SA | PA | PA | PN |
| B | SA | - | SA | PA | PA | PA |
| C | SA | SA | - | PN | PN | PA |
| X1 | PA | PA | PN | - | OA | PN |
| X2 | PA | PA | PN | OA | - | PA |
| X3 | PN | PA | PA | PN | PA | - |

Orientation Matrix after *Relation stripping*

Figure 11(e)

| Cavity Name | Face |
|---|---|
| A | Top |
| B | Top |
| C | Front |
| D | Front |

| | A | B | C | D |
|---|---|---|---|---|
| A | - | 0 | 1 | 1 |
| B | 0 | - | 1 | 1 |
| C | 1 | 1 | - | 0 |
| D | 2 | 2 | 0 | - |

Connectivity Matrix

Figure 14(a)

| | S | A | B | C | D | E |
|---|---|---|---|---|---|---|
| S | - | 0.53,V | 0.53,V | - | 0.3,V | 0.51,V |
| A | - | - | | 0,F | 0,F | 0.53,V |
| B | - | - | - | 0,F | 0,F | 0.53,V |
| C | - | - | - | - | - | 0.3,V |
| D | - | - | - | - | - | 0.51,V |
| E | - | - | - | - | - | - |

DAG before Transitive Closure

| | S | A | B | C | D | E |
|---|---|---|---|---|---|---|
| S | - | 0.53,V | 0.53,V | 0.53,V | 0.53,V | 1.0,V |
| A | - | - | | 0,F | 0,F | 0.53,V |
| B | - | - | - | 0,F | 0,F | 0.53,V |
| C | - | - | - | - | - | 0.3,V |
| D | - | - | - | - | - | 0.51,V |
| E | - | - | - | - | - | - |

DAG after Transitive Closure

For *X* direction

Figure 14(b)

| | S | D | C | B | A | E |
|---|---|---|---|---|---|---|
| S | - | 1.4,F | 2.5,V | 2.3,V | 2.3,V | - |
| D | - | - | 0.82,V | - | - | 0.51,V |
| C | - | - | - | 0,V | 0,V | 0.3,V |
| B | - | - | - | - | - | 0,V |
| A | - | - | - | - | - | 0,V |
| E | - | - | - | - | - | - |

DAG before Transitive Closure

| | S | D | C | B | A | E |
|---|---|---|---|---|---|---|
| S | - | 1.4,F | 2.5,V | 2.5,V | 2.5,V | 2.85,V |
| D | - | - | 1.1,V | 1.1,V | 1.1,V | 1.4,V |
| C | - | - | - | 0,V | 0,V | 0.3,V |
| B | - | - | - | - | - | 0,V |
| A | - | - | - | - | - | 0,V |
| E | - | - | - | - | - | - |

DAG after Transitive Closure

For *Y* direction

Figure 14(c)

| | S | B | A | D | C | E |
|---|---|---|---|---|---|---|
| S | - | 1.3,V | 1.3,V | 0.9,V | 0.64,V | - |
| B | - | - | 1.07,V | 0,V | 0,V | 0.53,V |
| A | - | - | - | 0,V | 0,V | 0.53,V |
| D | - | - | - | - | - | 0,V |
| C | - | - | - | - | - | 0,V |
| E | - | - | - | - | - | - |

DAG before Transitive Closure

| | S | B | A | D | C | E |
|---|---|---|---|---|---|---|
| S | - | 1.3,V | 2.4,V | 2.4,V | 2.4,V | 2.96,V |
| B | - | - | 1.07,V | 1.07,V | 1.07,V | 1.6,V |
| A | - | - | - | 0,V | 0,V | 0.53,V |
| D | - | - | - | - | - | 0,V |
| C | - | - | - | - | - | 0,V |
| E | - | - | - | - | - | - |

DAG after Transitive Closure

For *Z* direction

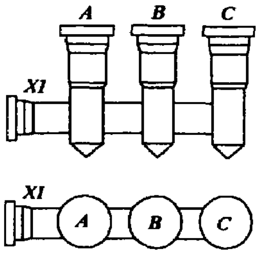

Front view

Top view

Before rectification. Illegal intersection of *X1* and *B*.

Figure 15 (a)

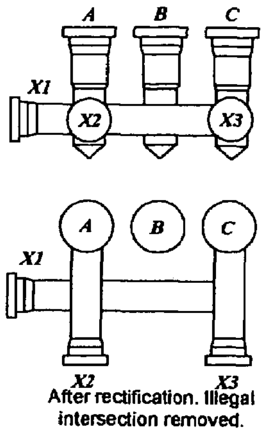

After rectification. Illegal intersection removed.

Figure 15 (b)

| | A | B | C | X1 |
|---|---|---|---|---|
| A | - | SA | SA | PA |
| B | SA | - | SA | PA |
| C | SA | SA | - | PA |
| X1 | PA | PA | PA | - |

Orientation Matrix

| | A | B | C | X1 |
|---|---|---|---|---|
| A | - | 0 | 0 | 1 |
| B | 0 | - | 0 | 1 |
| C | 0 | 0 | - | 1 |
| X1 | 1 | 1 | 1 | - |

Connectivity Matrix

Figure 15 (c)

| | A | B | C | X1 | X2 | X3 |
|---|---|---|---|---|---|---|
| A | - | SA | SA | PN | PA | PN |
| B | SA | - | SA | PN | PN | PN |
| C | SA | SA | - | PN | PN | PA |
| X1 | PN | PN | PN | - | PA | PA |
| X2 | PA | PN | PN | PA | - | SA, OA |
| X3 | PN | PN | PA | PA | SA, OA | - |

Orientation Matrix

| | A | B | C | X1 | X2 | X3 |
|---|---|---|---|---|---|---|
| A | - | 0 | 0 | 0 | 1 | 0 |
| B | 0 | - | 0 | 0 | 0 | 0 |
| C | 0 | 0 | - | 0 | 0 | 1 |
| X1 | 0 | 0 | 0 | - | 1 | 1 |
| X2 | 1 | 0 | 0 | 1 | - | 1 |
| X3 | 0 | 0 | 1 | 1 | 1 | - |

Connectivity Matrix

Figure 15 (d)

| PORT NAME | DESCRIPTION |
|---|---|
| A1, B1 | #10 SAE |
| AD, P | #8 SAE |
| DR | #8 SAE |
| GP | #4 SAE |
| T | #16 SAE |

| ITEM # | CAVITY/FOOTPRINT |
|---|---|
| 1 | C16-2 |
| 2 | C08-2 |
| 3 | C16-2 |
| 4 | C16-3S |
| 5 | C10-2 |
| 6 | C16-2 |

METHOD FOR AUTOMATING HYDRAULIC MANIFOLD DESIGN

BACKGROUND

Hydraulic manifold design is a complex, iterative, labor intensive and time-consuming process. While designing a manifold, a designer consciously works to minimize the size of the manifold and total number of cross-drills, while adhering to many complex and conflicting design constraints.

A hydraulic manifold is a solid block of aluminum or steel which has various hydraulic valves mounted on it (see FIG. 1). Drilled holes, called Cavities, are machined into the manifold block to house any valves and create required flow passages. Manifolds typically have a rectangular cross-section. The six faces of the cuboid manifold are named as shown in FIG. 2.

Cavities are precision-machined holes in the manifold. Geometrically, the formulation of each cavity is composed of a number of steps, which are machined with drill tools of varying diameters or by a form tool (see FIG. 3). Every cavity has zero or more ports (also known as working areas). FIG. 4 shows a cavity with 3 working ports. Ports are locations on the cavity, and are meant to accommodate connections with other cavities. All regions of a cavity surface, apart from ports, are called dead areas. Connections can only be made at ports on a cavity.

Cavities, for the purpose of defining this invention, are classified into two types: primary cavities and cross-drills.

Primary cavities are those cavities that accommodate valves and components defined in the input hydraulic circuit and which necessarily have to appear in the corresponding manifold. Each primary cavity has one or more than one ports.

Cross-drills, are single port cavities (containing only bottom ports) that are used only for making internal connections between primary cavities. While a designer must place on the manifold each and every primary cavity as required by the circuit, the number, shape, or the placement of cross-drills is entirely upon the manifold designer's choice.

The existing technique of manifold design, i.e., the current state-of-the-art, requires an engineer/designer to place cavities on the manifold surface and individually and sequentially connect them with each other inside the manifold, while meeting various design requirements such as flow considerations, internal wall-thickness, external clearance between components, etc. A good design is one that not only satisfies all such constraints, but also keeps manufacturing costs, e.g., volume of manifold, number of cross-drills used for connections, and the total drill length, etc., to a minimum. Manual manifold design is labor-intensive. Using CAD software tools available in the market, a skilled designer typically takes anywhere from eight to one hundred man-hours to design a manifold.

It would be desirable to provide a method to automate design of the hydraulic manifold, given a circuit and system constraints it would also be desirable to provide such a method which will not only make the design process almost instantaneous, but will also achieve significant improvements in the quality of the manifold design.

SUMMARY

A method for automatically designing a hydraulic manifold from a hydraulic circuit, cavity geometry and manifold design parameters, includes the steps of:

storing design patterns defining optimum orientation, connections and physical structure between a plurality of numbers of cavities and cavity manifold arrangements of all possible ways to connect all orientations of two cavities;

fetching the design patterns to locate an optimum pattern corresponding to a first pair of cavities from the hydraulic circuit;

removing any conflicts between two cavities in the design pattern;

merging all of the remaining cavities from the hydraulic circuit, one at a time, into an evolving manifold topology allocating a manifold face for each cavity; and substantiating the manifold design.

The step of storing the design patterns includes the step of storing orientation information for all of the cavities and between all of the cavities in each design pattern, such as by:

storing orientation relations between two cavities;

storing orientation relations of all cross-drills required to create the required connections between the two cavities; and storing orientation information for each of the cross-drills with respect to each of the two cavities.

The step of storing design patterns includes the step of:

storing connectivity information for each of the cavities; and storing actual physical structure of each of the cavities in each pattern, including all cross-drills.

The step of removing conflicts includes the step of removing a conflict among any three cavities where an orientation relation between any two of the three cavities cannot be realized.

Constructing the evolving manifold topology includes the step of merging an orientation matrix and a connectivity matrix for the initial pair of cavities and with an orientation matrix and a connectivity matrix for each additional cavity.

The method further includes the steps of implementing a relations stripping process to strip away relation values incompatible with the values in the rest of the evolving manifold topology.

The step of substantiating the manifold design further includes the steps of establishing two attributes for each cavity, including the exact location of each cavity on one face of the manifold and its depth to a bottommost point from the surface of the face on which it is placed.

The method further includes the step of validating a feasible ordering of the bottommost point of all cavities-along X, Y and Z directions through a transitive closure algorithm.

The method also includes the step of inserting a necessary wall thickness between every two adjacent cavities and cross-drills. This step includes constructing a directed acycilic graph in which nodes represent the bottommost points of each cavity and directed edges represent a distance constraint between the bottommost points. The purpose of the directed acyclic graph is to assign a fixed coordinate value to the bottommost point of each cavity.

Finally, the method exports the three dimensional manifold design in a file to a CAD program for generation of a 3-D model of the manifold.

The manifold design automation method works by decomposing and objectifying the highly subjective and complex cognition based process of manifold design. This method starts with a parametric hydraulic circuit with embedded constraints, and automatically creates a three dimensional, valid, manifold design solution. Corresponding to each component in the circuit, based on its geometry parameters, the method selects an appropriate cavity to be placed in the manifold. After this set of cavities (called primary cavities) is placed in a manifold block, based on connectivity data extracted from circuit, the primary cavities are connected to each other using cross-drills. The desired objectives of compactness, flow characteristics, etc., are maximized while manufacturing costs are minimized, simultaneously meeting design and manufacturing constraints.

BRIEF DESCRIPTION OF DRAWING

The description herein makes reference to the accompanying drawings wherein like reference numerals refer to like parts throughout the several views, and wherein:

FIG. 5(*b*) is a pictorial representation of a manifold showing the placement of two cavities with an orientation relation SN;

FIG. 5(*c*) is a pictorial representation of a manifold showing the placement of two cavities with an orientation relation PA;

FIG. 5(*d*) is a pictorial representation of a manifold showing the placement of two cavities with an orientation relation PN;

FIG. 5(*e*) is a pictorial representation of showing the placement of two cavities with an orientation relation OC;

FIG. 5(*f*) is a pictorial representation of a manifold showing the placement of two cavities with an orientation relation OA;

FIG. 5(*g*) is a pictorial representation of a manifold showing the placement of two cavities with an orientation relation ON;

FIG. 6(*b*) is a connectivity matrix of cavities in a manifold;

FIG. 6(*c*) is an isometric view of cavities in a manifold;

FIG. 6(*d*) is an isometric view of cavities in a manifold;

FIG. 6(*e*) is an isometric view of cavities in a manifold;

FIG. 6(*f*) is an isometric view of cavities in a manifold;

FIG. 7(*b*) is a connectivity matrix of cavities in a manifold;

FIG. 10 is a chart of all possible conflict-free orientation relations between three cavities A, B and C;

FIG. 11 (*a*) is a pictorial representation of orientation and connectivity matrices of evolving manifold topology (EMT);

FIG. 11(*b*) is a pictorial representation of an orientation and connectivity matrices of a design pattern;

FIG. 11(*c*) is a pictorial representation of an orientation matrix of the EMT after merging with the orientation matrix of the design pattern;

FIG. 11(*d*) is a pictorial representation of a connectivity matrix of the EMT after merging with the connectivity matrix of the design pattern;

FIG. 11(*e*) is a pictorial representation of an orientation matrix of the EMT after relation stripping;

FIG. 13(*b*) is an isometric view of a manifold containing cavities A, B and C respectively on top, front and right faces;

FIG. 13(*c*) is an isometric view of a manifold containing cavities A, B and C respectively on top, front and left faces;

FIG. 14(*b*) is a pictorial representation of DAG in the X direction for a manifold substantiation module;

FIG. 14(*c*) is a pictorial representation of DAG in the Y direction for a manifold substantiation module;

FIG. 14(*d*) is a pictorial representation of DAG in the Z direction for a manifold substantiation module;

FIG. 14(*e*) is a pictorial representation of isometric view of the manifold for a manifold substantiation module;

FIG. 15(*a*) is a pictorial representation of an illegal intersection of cross-drill X1 with cavity B;

FIG. 15(*b*) is a pictorial representation of the removal of an illegal intersection of cross-drill X1 with cavity B;

FIG. 15(*c*) depicts a topology representation matrix corresponding to the cavities shown in FIG. 14(*a*);

FIG. 15(*d*) depicts a topology representation matrix corresponding to the cavities shown in FIG. 14(*b*);

DETAILED DESCRIPTION

Figure 1:
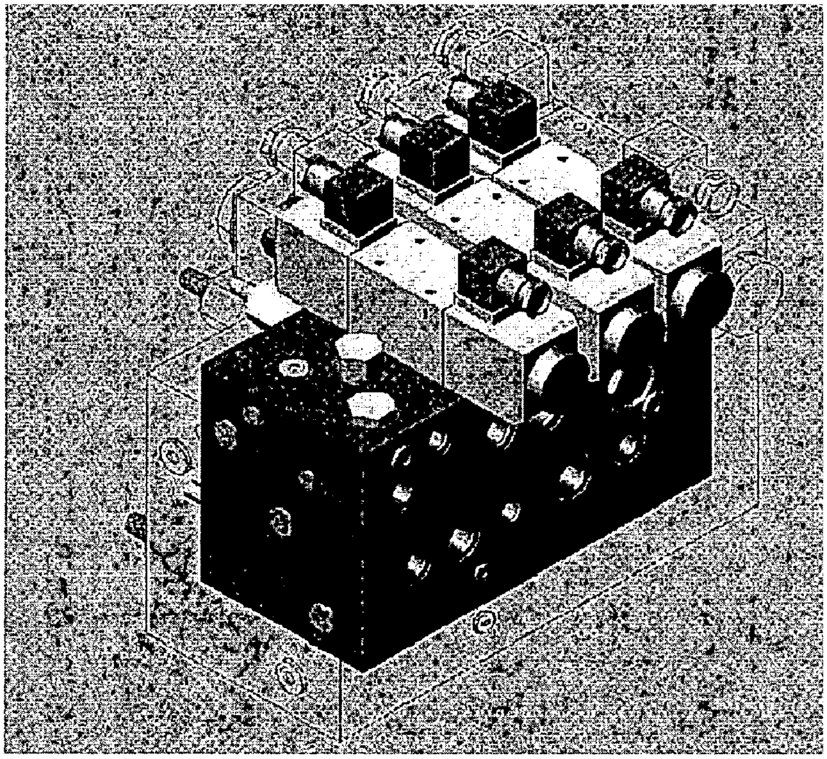
FIG. 1 is a perspective view of an actual hydraulic manifold with mounted valves.
Figure 2:
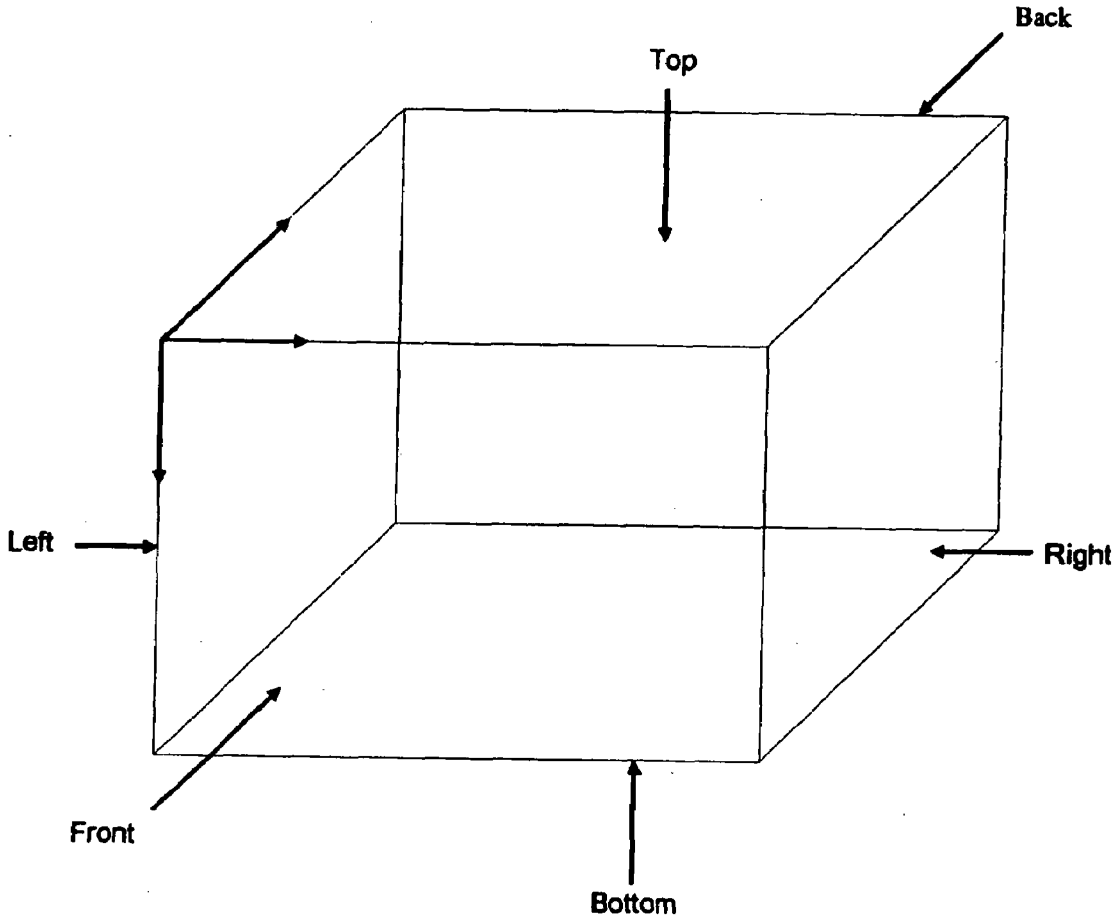
FIG. 2 is a pictorial representation of a naming convention for the six faces of a cuboid manifold block.
Figure 3:
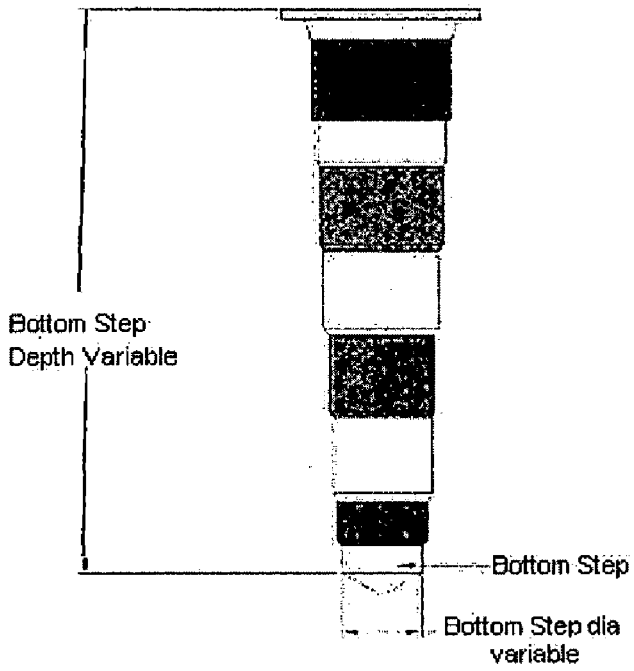
FIG. 3 is an elevation view of a geometrical structure of a cavity showing bottom step diameter and depth variable.
Figure 4:
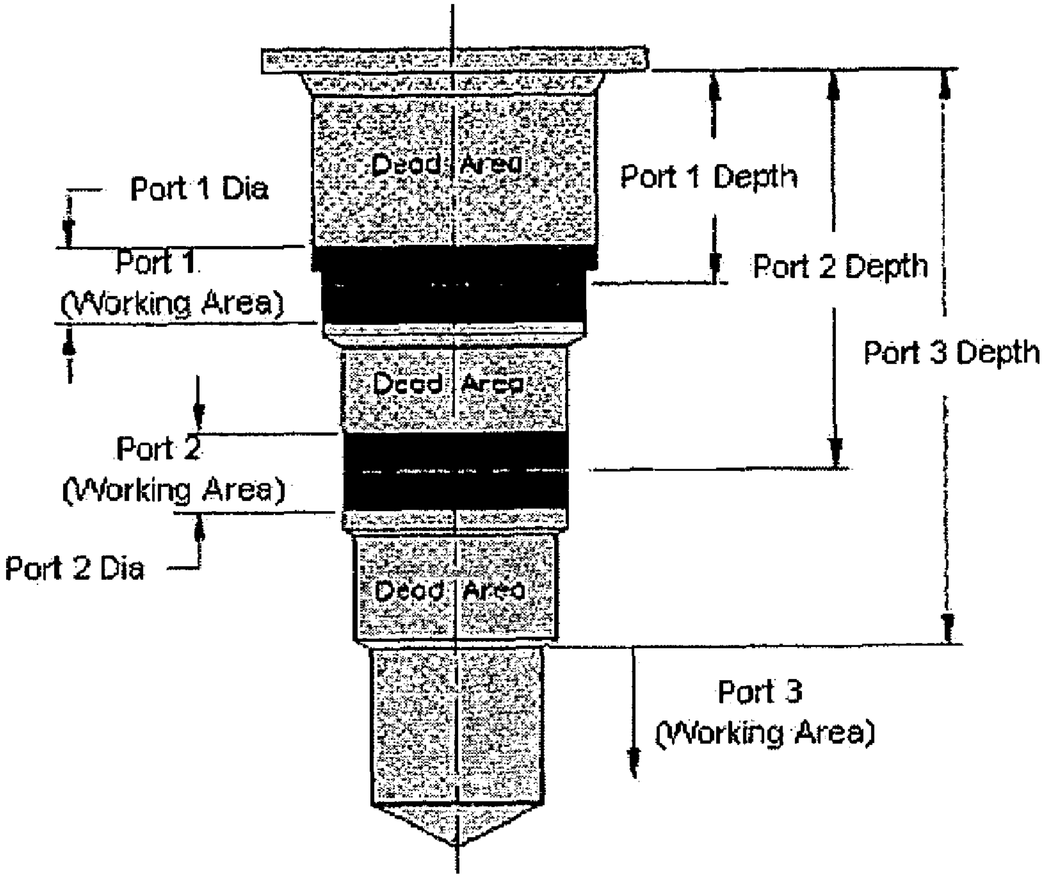
FIG. 4 is an elevational view of the geometrical structure of a cavity showing port area and dead area.
Figure 5A:
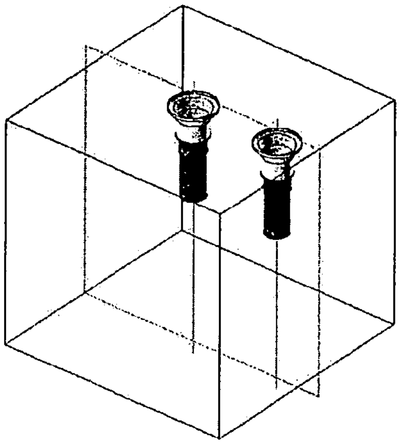
FIG. 5(*a*) is a pictorial representation of a manifold showing the placement of two cavities with an orientation relation SA.
Figure 5B:
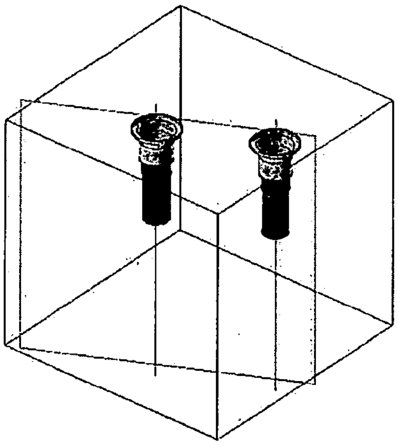
Figure 5C:
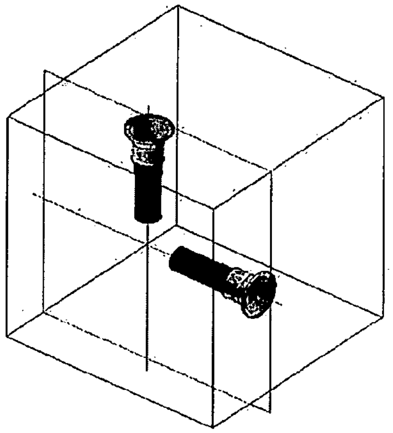
Figure 5D:
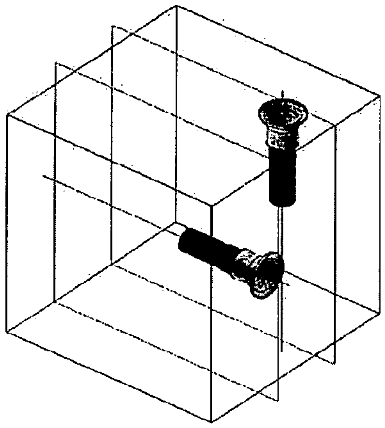
Figure 5E:
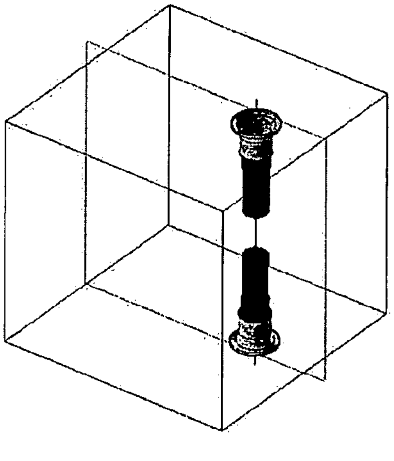
Figure 5F:
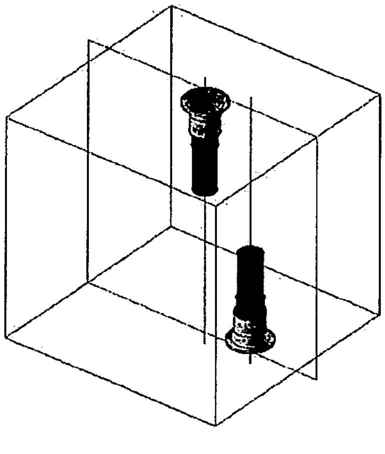
Figures 5G, 6A, 6B:
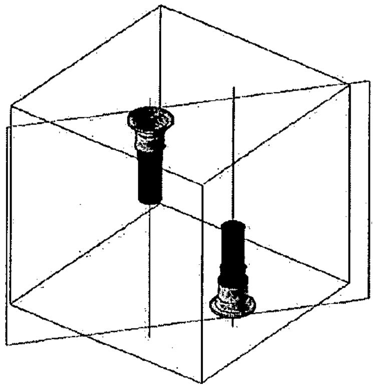
FIG. 6(*a*) is an orientation matrix of cavities in a manifold.
Figure 6C:
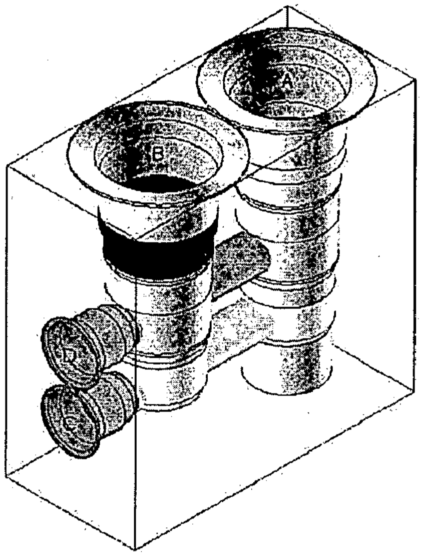
Figure 6D:
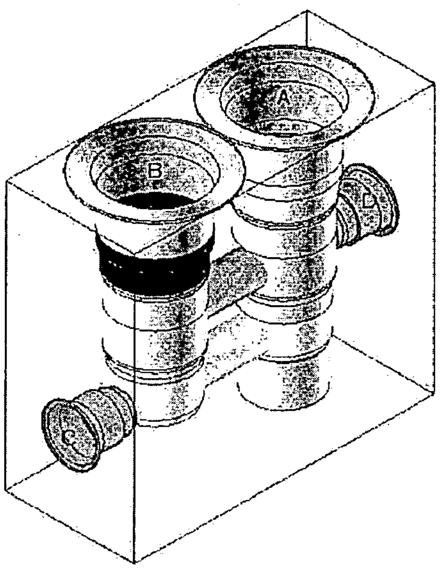
Figure 6E:
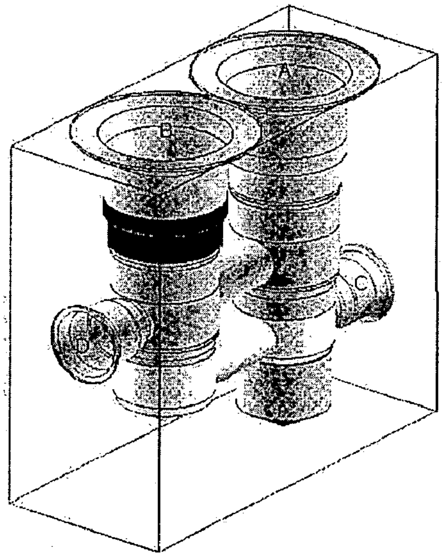
Figure 6F:
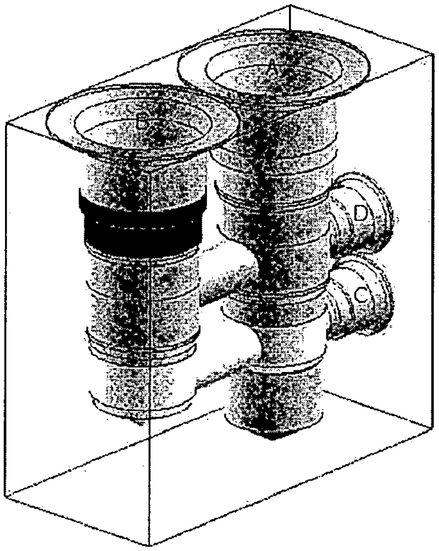

This invention is a method to completely automate the process of designing a hydraulic manifold. The traditional, manual design process is highly complicated, but works because it can tap into the extremely powerful decision-making abilities of the human brain. This invention decomposes the design process into modules, computerizes mathematical techniques to replicate the human design process, and combines these modules into an expert system. The sections below describe the individual concepts and modules that constitute the complete automatic design method.

1. Manifold Topology Representation—Concept

Before proceeding with design, a manifold must be translated into a representation that a computer can read and manipulate. Since the actual dimensions of the manifold block are unknown until the very last stage of this automatic design method, in the first step, merely the topology, that is, how cavities are oriented relative to each other and how they are mutually connected, is represented. This is called manifold topology representation and is described below.

The connectivity and relative orientation relationship between cavities are defined using two matrices: an orientation matrix stores orientation relations, and a connectivity matrix stores connectivity information.

The various orientation relations possible between two cavities when they are placed on manifold are specified below:

a. Same aligned (SA): The orientation between two cavities is SA if they are on the same face and their axes lie in a plane which is parallel to either face of the cuboid manifold block. See FIG. 5(*a*).

b. Same non aligned (SN): The orientation between two cavities is SN if they are on the same face and their axes lie in a plane which is not parallel to either face of the cuboid manifold block. See FIG. 5(*b*).

c. Perpendicular aligned (PA): The orientation between two cavities is PA if they are on perpendicular faces and their axes are coplanar See FIG. 5(*c*).

d. Perpendicular non aligned (PN): The orientation between two cavities is PN if they are on perpendicular faces and their axes are non coplanar. See FIG. 5(*d*).

e. Opposite coincident (OC): The orientation between two cavities is OC if they are on opposite faces and their axes are collinear. See FIG. 5(*e*).

f. Opposite aligned (OA): The orientation between two cavities is OA if they are on opposite face and their axes lie in a plane which is parallel to either face of the cuboid manifold block. See FIG. 5(*f*).

g. Opposite non aligned (ON): The orientation between two cavities is ON if they are on opposite face and their axes lie in a plane which is not parallel to either face of the cuboid manifold block. See FIG. 5(*g*).

h. All Relations (ALL): The orientation between two cavities is ALL if all orientation specified above is possible.

Each cell of orientation matrix may have multiple entries.

In the connectivity matrix the numbers represent the ports involved in each connection. In the connectivity matrix, the value in the cell ij represents the port of the $j^{th}$ cavity that connects with some port of the $i^{th}$ cavity, and the value in cell ji represents the port of the $i^{th}$ cavity that connects with the port of the $j^{th}$ cavity. A zero in any of the cells implies there is no connection between the two cavities. FIG. 6(*b*)

Exploiting the fact that an orientation matrix can carry multiple entries in each cell, more than one topology can be represented using only an orientation matrix along with a connectivity matrix. For example, consider the two matrices shown in FIG. 6(*a*)-(*b*). They represent forty-eight different topologies appropriate for placing four cavities named A, B, C, and D on a manifold block. Of these, four topologies are shown realized on a manifold block in FIG. 6(*c*)-(*f*). As can be seen, a single orientation matrix suffices to represent all these forty-eight topologies. This is one attribute of the manifold topology representation.

2. Design Pattern Base—Concept

If two primary cavities need to be connected to each other in a specific manner, the method finds the best way to orient them with respect to each other such that the least number of cross-drills are required to complete all the connections. For instance, if it is required to implement connection between bottom port of two cavities A and B, the most optimum orientation between two cavity is PA and their bottom ports join each other directly (see FIG. 7(*a*)). This requires no extra cross-drill. In comparison, if orientation is SA, making the same connection shall require one cross-drill X1 (see FIG. 7(*b*)).

Figure 7A:
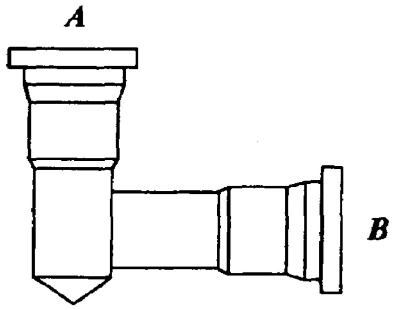
FIG. 7(*a*) is an orientation matrix of cavities in a manifold.
Figure 7B:
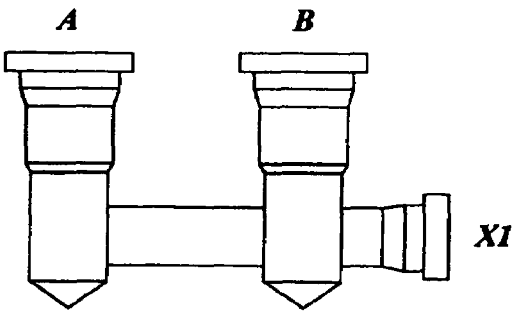

The case shown in FIGS. 7(*a*)-(*b*) is a simple case that involves only one connection between the two primary cavities. In a similar fashion, such 'best ways' are mapped by the method for cases involving more than one connection between the two primary cavities.

Design Pattern: Every above-mentioned 'best way' to connect two primary cavities is called a design pattern. Each of these design patterns carries information about not only the two primary cavities involved but also about the extra cross-drills that are needed to complete the connections between them. This information is divided into three parts:

Orientation information: This information contains the following data:

1. Orientation relation between the two primary cavities.

2. Orientation relations of all extra cross-drills required to create the required connections with respect to each other.

3. Orientation information of each of the cross-drills with respect to each of the primary cavities.

Orientation information is a record of how every cavity in the 'best-way' pattern (including cross-drills) is oriented with respect to the every other cavity. The Orientation Matrix stores this data.

Connectivity information: Apart from orientation, a pattern must also convey how the cavities it contains are connected to each other. A connectivity matrix stores this information.

Physical structure information: The third component to complement the matrix is the record of the actual physical structure of each of the cavities in the pattern including that of the cross-drills. This contains the information on the geometric shape and size of each cavity, location of its ports and dead areas etc.

Knowledge base: All the possible orientations of a pair of primary cavities can be considered one by one and a knowledge base of ways to connect them are established. This knowledge base is an attempt to capture in an objective form a human designer's knowledge of a number of appropriate ways to connect two primary cavities. The automation method accesses the knowledge base repeatedly to determine how one cavity should be placed with respect to another during manifold evolution. In the context of this method, this knowledge base is termed as Design Pattern Base.

3. Manifold Design Engine—Modules

This section describes the actual programmatic elements, or modules, that work together to form a software embodiment of the method. These elements make extensive use of the Manifold Topology Representation and the Design Pattern Base, the two concepts described in preceding sections.

Figure 8:
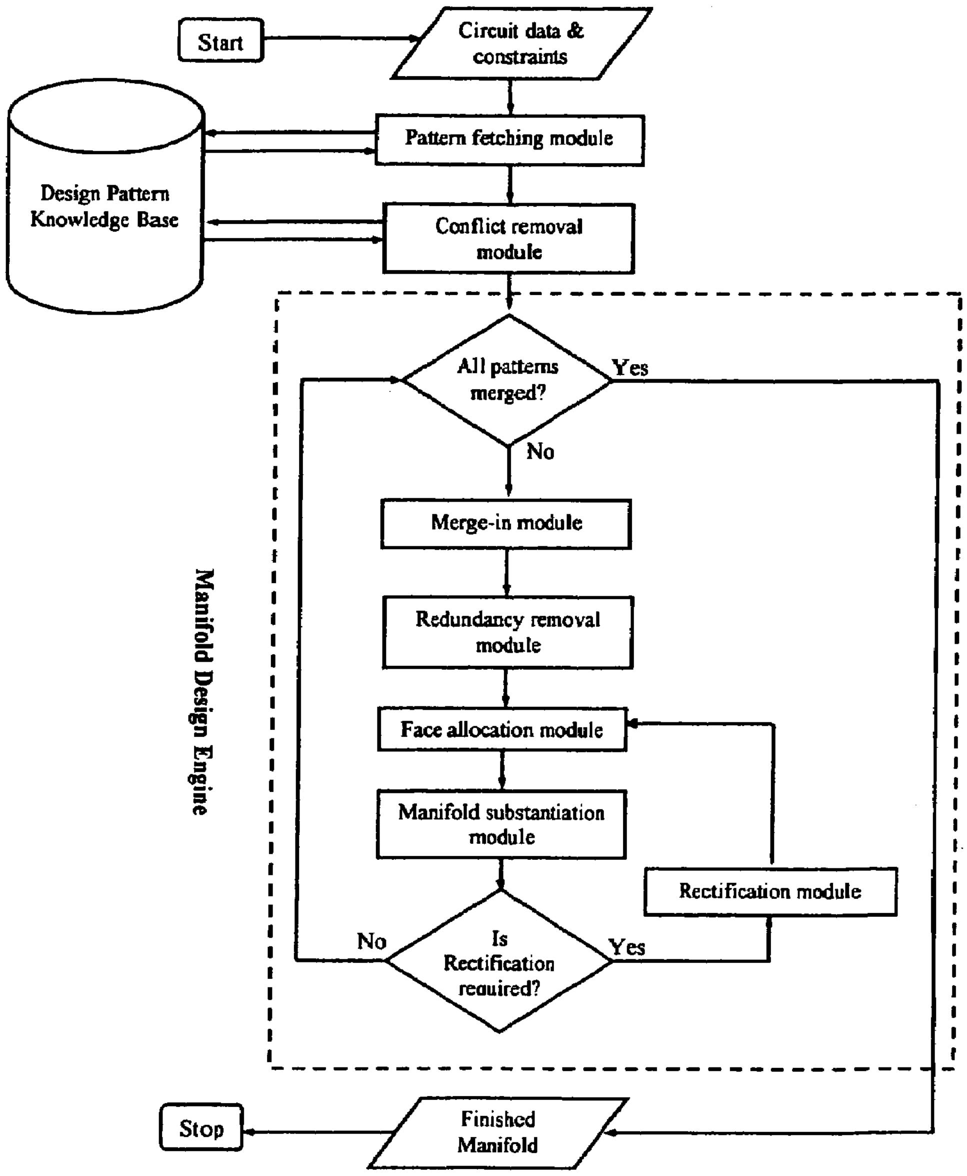
FIG. 8 is a flow-chart of a manifold design automation algorithm.

A manifold design engine is the master program that accepts inputs from a hydraulic circuit, manages inter-operations between its various constituent sub-modules and interacts with the design pattern knowledge base to automatically create a manifold (see FIG. 8)

The engine evolves a manifold topology connection by connection like a human designer until a completed manifold is obtained. All the time during this evolution, the engine carries the evolving manifold topology (EMT) in the form of manifold topology representation (two matrix, connectivity and orientation) along with the physical structure of each cavity existing in manifold. EMT is represented in exactly the same way as a design pattern. The only distinction between a design pattern and EMT is that, unlike the former, the latter can, and at most times, does contain more than two primary cavities.

The structure of design patterns and EMT is similar. While evolving a manifold, the design engine picks patterns one by one and keeps merging them into the EMT.

The following section describes the process of manifold evolution in more detail.

Manifold Evolution:

The manifold design engine accepts as input the hydraulic circuit data (which comprises geometrical structure of all primary cavities and their connectivity information) and the constraints supplied with circuit. This input defines the expectations of the user about the kind of manifold to be designed by the engine.

Next, the design engine calls the fetch pattern module repeatedly and obtains patterns for all the possible pairs of primary cavities that have connections. All these obtained patterns are sorted in the descending order of the number of cross-drills contained in them. This is the order in which these patterns will be merged into topology representation. This ensures that in the conflict removal module, patterns with greater number of cross-drills face a less probability of alteration (this is explained below in the section on conflict removal module). From here starts the sequence that leads to a finished manifold (FIG. 8).

Individual modules in FIG. 8 are described below:

Fetch Pattern Module: This module establishes a design pattern for every possible pair among all the primary cavities specified in the input to the engine.

For each pair of primary cavities, it identifies all the needed connections between them, based on their connectivity information. It then fetches a design pattern from the pattern base with the least number of cross-drills in it.

Figure 9:
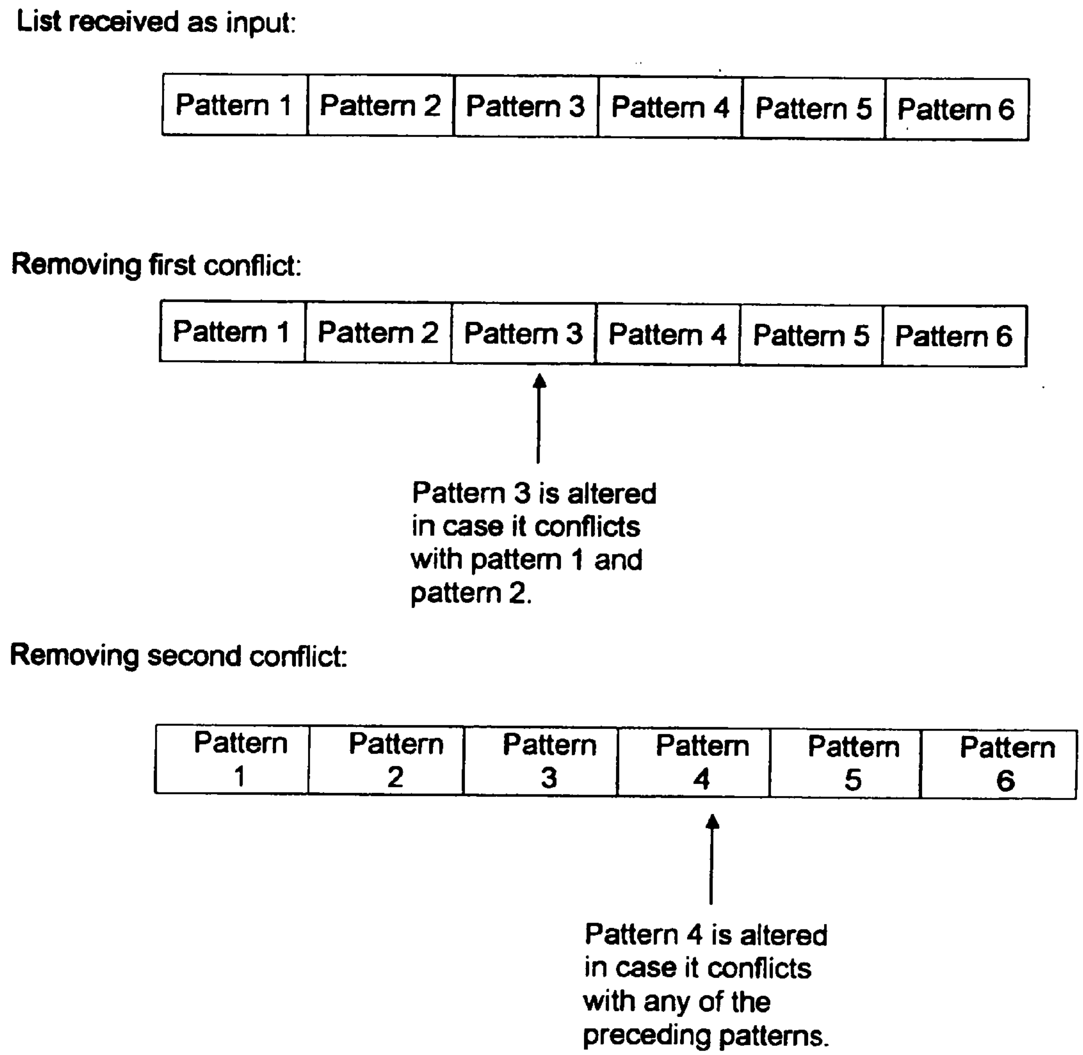
FIG. 9 is a diagram depicting a process of conflict removal.

Once all required patterns are obtained, they are arranged in the descending order of their number of cross-drills in a list, as shown in FIG. 9. This list forms the input for the conflict removal module.

Conflict Removal Module: A conflict among any three primary cavities is defined as an orientation relation between any two of them which, when all three cavities are considered simultaneously, is impossible to realize. For instance, if cavities A and B have the orientation relation SA between them, cavities B and C have the relation SA and then the only possible relations between cavities A and C are SA or SN. If the relation between A and C is specified to be anything other than SA or SN, it represents a conflict. (FIG. 10 lists all the possible non-conflicting orientation relations between cavity A and C for various given orientation relations between cavities A and B, and between cavities B and C.)

This module operates on the ordered list of patterns (see FIG. 9), which it receives as input from the Fetch Pattern Module. The conflict removal module parses this list from the beginning to end and removes conflicts as it goes along. If a pattern is found to have a conflict with any two among all of its preceding patterns, then an orientation that does not conflict is selected (see FIG. 10). Then the next best pattern (having the next higher number of cross-drills) for that chosen orientation is obtained from the pattern base and the conflict pattern is replaced with it.

The first two patterns cannot possibly have a conflict between them because exactly three patterns are needed for a conflict to exist. The process of conflict removal starts from the third pattern in the list and, after comparing it with the first two, a conflict, if it exists, is removed (see FIG. 9). Next, the fourth pattern is compared one by one with every pair of patterns among the first three. Again, if any conflict exists, it is removed. The module continues until the end of the list is reached and all conflicts are removed.

Merge-In Module: This module, in essence, is the agent that actually evolves the manifold. It accepts a design pattern as input and merges it into the already existing EMT. Merging involves adding all the data of all the cavities in the pattern (including cross-drills) into the EMT (see FIG. 11).

The complete merge-in procedure can be illustrated with the example shown in FIG. 11. In this example, all names containing an 'X' and a numeral signify cross-drills, while names containing only a letter, without any numeral, represent primary cavities.

FIG. 11(*a*) shows an orientation and a connectivity matrix, which together form an EMT. It contains four cavities: primary cavities A and B, and cross-drills X1 and X2. Figure(*b*) shows a design pattern presented in terms of its own two matrix. This pattern contains primary cavities B, C and a cross-drill X3, three cavities in all. In order to illustrate the merge-in function, the pattern in FIG. 11(*b*) is to be merged into the EMT shown in FIG. 11(*a*). This works as described below:

Orientation Matrix Merging: First, the orientation matrix of the pattern (PO) is merged into the orientation matrix of the EMT (EO). It can be seen that cavity B already exists in EO; cavities C and X3, on the other hand, do not. Therefore, EO must be expanded suitably to accommodate these two new cavities. Two rows, one for C and one for X3, and two columns, one for each, are inserted in this matrix for this purpose, and the resulting matrix after this expansion is shown in FIG. 11(*c*).

FIG.(*c*) also shows that the relation values in cells that existed in EO before the above-said expansion remain unchanged; but certain new values appear in the cells of the two newly inserted rows and the two columns. These new values, wherever possible, are copied into the expanded EO from the corresponding cells in PO. For example, the relation SA in cell CB (the cell lying on the intersection of the row titled C and the column titled B) of the expanded EO. This relation specifies the orientation between cavities C and B. It has been copied into the expanded EO from the corresponding cell CB in the PO, because in the PO (FIG. 11(*a*)) cell CB contains the same relation SA. This implies in physical terms that if a relationship between any two cavities in the design pattern is specified, it must be carried unchanged into the expanded EO while merging-in. In this case, the relationship SA between C and B, which is specified in the design pattern, is maintained unaltered in the expanded EO.

Those cells in the expanded EO that are not common with PO are filled with are the relation value of ALL. For example, since cell CA does not exist in PO, it is filled with ALL. This is because, since no orientation relation between cavities C and A is specified in the pattern, all orientation relations between them are assumed to be possible.

This procedure is followed for all cells and thus merging-in of PO with EO is accomplished.

Connectivity Matrix Merging: After merging orientation matrix, the connectivity matrix of the design pattern (PC) must be merged into the connectivity matrix of the EMT (EC). This procedure is very similar to orientation matrix merging.

Like the EO, the EC must be expanded to accommodate new cavities C and X3. The expanded EC obtained after this expansion is shown in FIG. 11(*d*). As in the case of orientation matrix merging, the cells in EC that exist before expansion retain their values after expansion, and the newly inserted cells, just like earlier, are filled with new values. Among the new cells in the expanded EC, those that are common to EC and PC receive their values as copied in from the PC. Once again, for example, the cell CB in the expanded EC gets its value copied from the cell CB in PC. In this way, all the connectivity information from the pattern is copied into the newly inserted cells in the EC. In the cells that are not common to both EC and PC, a value of 0 is placed, which signifies 'no connection'.

Relation Stripping: The third and final step constituting the merge-in module is the relations stripping process. This step operates on those cells in the expanded EO that contain multiple relation values or ALL relations. In each such cell, it strips away those relation values that are incompatible with the values in the rest of the EO. Also, after only the compatible values remain in a cell, one arbitrary relation value is chosen so as to arrive at a single topology. For example, by applying stripping to the EO obtained after orientation matrix merging (shown in FIG. 11(*c*)), we obtain an orientation matrix shown in FIG. 11(*e*) each cell of which has all relations except the one stripped away. For example, after the relation stripping process, the cell CX1 contains only one relation PN, instead of ALL.

These three steps, of merging and stripping, together constitute the merge-in module.

Figure 12:
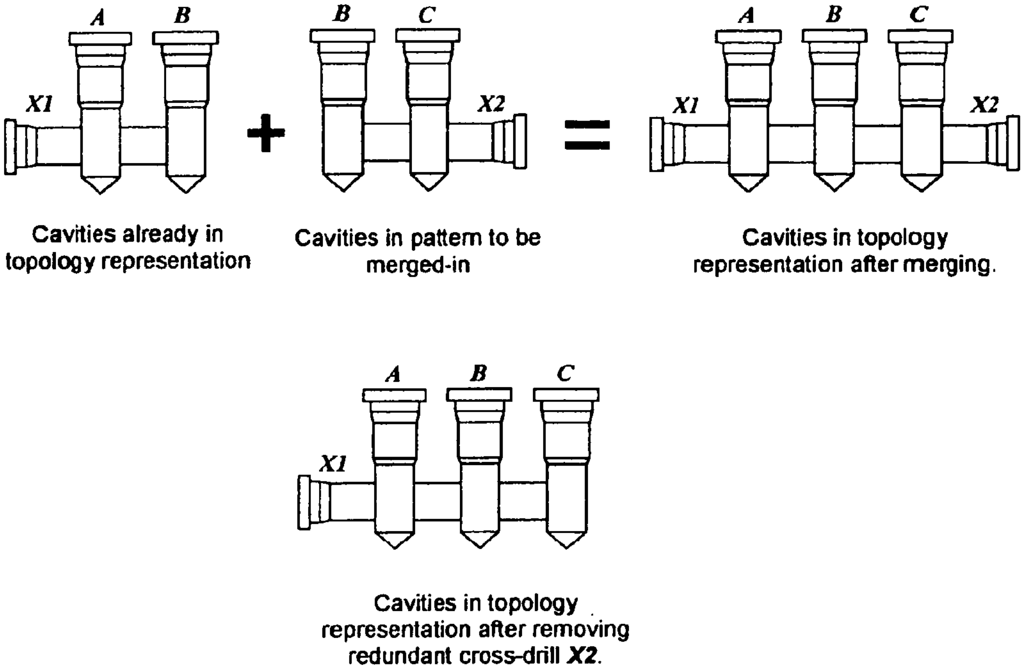
FIG. 12 represents an example of a redundancy removal module where A, B, C are three primary cavities and X1, X2 are two cross-drills.

Redundancy Removal Module: When a new pattern is merged-in, it sometimes contains cross-drills that can be replaced, after some modifications, by already existing primary cavities or cross-drills in the EMT. Consider the example in FIG. 12. Here, cavities A, B and cross-drill X1 were already existing and a pattern containing B, C and a cross-drill X2 has just been merged-in. Redundancy removal module works by replacing cross-drill X2 by X1 after lengthening the latter and connecting it with cavity C. This is achieved by comparing the location of each newly added cross-drill with all the previously existing cavities (both primary and cross-drills) in the EMT. The module checks to see if any new cross-drill connects to the same port of a common primary cavity as does another pre-existing cavity, and if both of them can be aligned with each other. If both of above conditions are true it replaces the new cross-drill with the pre-existing cavity.

As shown in FIG. 8, redundancy removal module runs immediately after a pattern is merged-in. As the manifold grows, all cross-drills that are redundant are expunged, thus minimizing the cross-drill count.

Figure 13A:
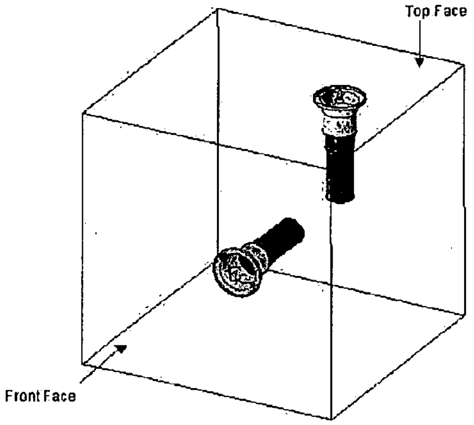
FIG. 13(*a*) is an isometric view of a manifold containing cavities A and B respectively on top and front faces.
Figure 13B:
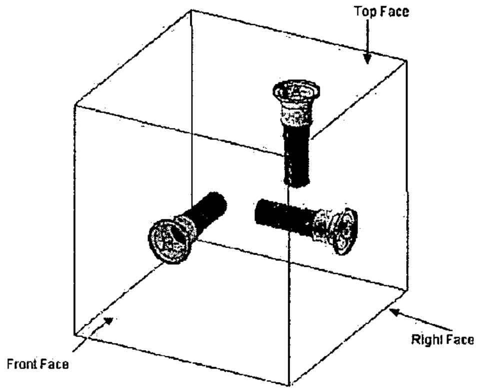
Figure 13C:
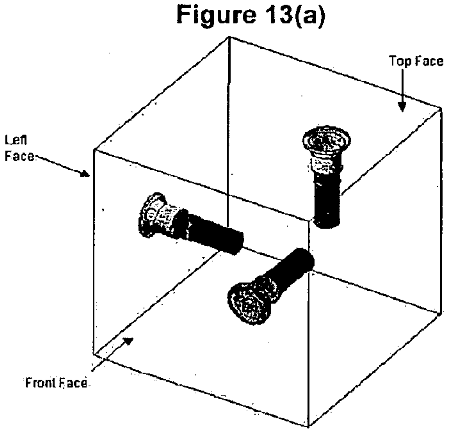

Face Allocation Module: Called to operate after the merge-in module, face allocation module establishes for each newly merged-in cavity the face of the manifold block on which it must go. Even after the stripping relations operation (as described in merge-in module section), some of these new cavities posses valid options of being placed on one of many faces. In the example in FIG. 13(*a*), cavities A and B already exist in the EMT, cavity A placed on the Top face and B on Front. Assuming that after merging in, a third cavity, C, appears in the EMT for which the orientation matrix dictates that it must stay perpendicular to both A as well as B. As FIGS. 13(*b*) and 13(*c*) show, despite respecting this orientation relation constraint, cavity C can be placed on either of the Left or Right faces. The face allocation module removes this ambiguity by allocating either Left or Right face to cavity C.

Face allocation module is called whenever new cavities appear in the EMT, both after merging in a new pattern as well as after a run of the rectification, because the rectification module too can introduce new cavities.

Rectification module: The rectification module runs immediately after the manifold substantiation module, if required. It acts to remove all the illegal intersections in the manifold by adding extra cross-drills.

Manifold Substantiation Module: This module receives the EMT in the form of a connectivity matrix, an orientation matrix and the geometric data of all cavities, with faces on manifold block already allocated. This module's function is to establish two attributes for each cavity: the cavity's exact location on the face on which it is placed and it's depth, i.e., the distance of its bottom most point from the surface on which it is placed.

Determining these two attributes is equivalent to merely establishing the three coordinates, X, Y and Z, of the bottom most point (referred to as BP henceforth) of the given cavity. Recalling the physical structure of a cavity described in the 'Background' section, the depth of the bottom step of every cavity is variable. Therefore, in effect, the depth of BP from manifold surface too can be varied at will. Therefore, if the axis of a cavity A lies along, say, X ordinate, then its BP depth is determined by the X ordinate of the BP. Also, if, without altering the orientation of the cavity in the XYZ reference frame of the manifold block, the Y or Z coordinates of A are established, this will effectively establishes the Y and Z coordinates of cavity A on the manifold surface it is mounted on.

By virtue of this equivalence and for the sake of simplicity, instead of invoking the attributes location and depth, manifold substantiation is described only in terms of these three coordinates X, Y and Z of the BP in the following text.

For determining X, Y and Z coordinates of BP, this module first computes the feasible ordering of the BPs of all cavities along all three, X, Y and Z directions. An ordering is considered feasible if all BPs can be arranged according to it without any illegal intersections between cavities. For deriving from the input a feasible ordering between every two BPs, a proper order is chosen based on their mutual connectivity information from the connectivity matrix. Then Transitive Closure Algorithm is used to validate the chosen ordering.

The Transitive closure Algorithm can be defined as follows. Consider a directed graph G=(V, E), where V is the set of vertices and E is the set of edges. The transitive closure of G is a graph G+=(V, E+) such that for all v, w in V there is an edge (v, w) in E+, if and only if there is a non-null path from v to w in G.

After completing the ordering between every two adjacent cavities the necessary amount of wall thickness is inserted. This is done by constructing a Directed Acyclic Graph (DAG), where nodes represent cavity BPs and directed edges represent the distance constraint between these points. A distance constraint can be of two types: the first that says that distance between the two points should be greater than a given value and the second that says it should be equal to a given value. The DAG is constructed using the computed ordering and the data input to this module. If one node, say, Node 1 precedes another, Node 2, in the ordering, then a directed edge is possible from Node 1 to Node 2 but no directed edge is possible from Node 2 to Node 1. Next, distance constraints are propagated transitively in the DAG. From the resulting DAG, an actual, fixed coordinate value is assigned to every BP. This process works for one direction at a time. So it is repeated for all three X, Y and Z directions. Once this is accomplished, the actual span of the whole assembly of cavities in all three directions is obtained and therefore the minimum required dimensions of the manifold block are also obtained.

Figures 14D, 14E:
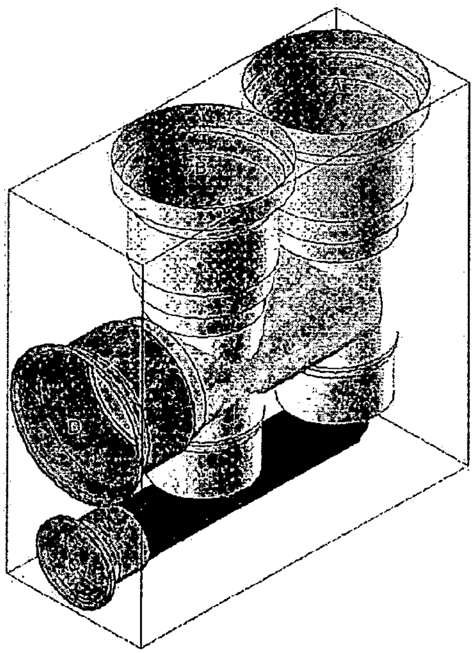
FIG. 14(*a*) is face allocated to cavity and connectivity matrices for a manifold substantiation module.

Illustration: Consider the connectivity matrix of cavities and a table of faces allocation to cavities as shown in FIG. 14(*a*) as input. The DAG can be represented using a matrix. The value in cell IJ (where I represents row number and J represents column number of this matrix) represents value of the directed edge from node I to node J. The value of directed edge represents distance constraints between the two points. The distance constraint can be of two types—the first says that the distance between the two points should be greater than a given value (represented by value F). For constructing DAG, all geometric data is considered in inches. Using this representation, and listing cavity names in the matrix according to the derived ordering, DAG for the input (FIG. 14(*a*)) has been shown in FIG. 14(*b*), FIG. 14(*c*), FIG. 14(*d*), for X, Y, and Z directions, respectively. In each of the FIG. 14(*b*), FIG. 14(*c*), and FIG. 14(*d*) both, DAG before applying Transitive Closure, and after applying Transitive Closure, has been shown. Apart from cavity names, the DAG matrix also contains two rows and columns titled S and E. These are two faces of manifold, which are normal to the direction of construction of DAG, where S represents a face which contains an origin and E, the other face. Using the DAG obtained after applying Transitive Closure, an actual, fixed coordinate value is assigned to every BP. The manifold obtained after substantiation is shown in FIG. 14(*e*).

As discussed earlier, distance constraints can be of two types:

1. The first constraint type dictates that the distance between the two BPs should be greater than a given value. This constraint is represented using a pair (value, V) where value is the actual distance value and V is used to specify constraint type.

2. The second constraint type dictates that the distance between the two BPs should be equal to a given value. This constraint is represented using a pair (value, F) where F specifies type of constraint, and value is actual distance value.

If the distance constraint between BPs of cavity pair A B and cavity pair B C is given, then the derived distance constraint between BPs of cavity A and C is shown in Table 1:

Table 1 is used by Transitive Closure Algorithm to propagate distance constraints in the entire DAG once it is constructed.

TABLE 1

| AB | BC | AC |
|---|---|---|
| Value1, V | Value2, V | Value1 + Value2, V |
| Value1, V | Value2, F | Value1 + Value2, V |
| Value1, F | Value2, V | Value1 + Value2, V |
| Value1, F | Value2, F | Value1 + Value2, F |

Procedure for DAG Construction

For each direction of a DAG there are two parallel faces of manifold which are normal to the direction of the construction of DAG. Face S is the face that contains the origin or the (S)tart of the ordered cavities and E represents the (E)nding face, i.e. the face opposite to face S. Since no cavity can go outside the surface of the manifold, in the computed ordering, S is pre-inserted in the beginning, and E is pre-inserted at the end of the order. The size of matrix used to represent DAG is equal to the number of elements in the ordering.

1. Initialize the matrix with user distance constraints, if any.

2. A pair of elements (e1, e2) is valid if e1 lies before e2 in the ordering. If all considered pairs are valid, then exit.

3. Else, take one valid pair, which is not used for DAG construction. Determine whether they are connected or unconnected. If connected execute step 4, else execute step 5.

4. In the cell ij (where i represents row of element e1 and j the column of element e2 of this matrix), assign a distance constraint. The value of distance constraint is computed from their connectivity information and geometric information.

5. In the cell ij (where i represents row of element e1 and j, column of element e2, of this matrix) assign distance constraint only if their projection on face S or E overlaps (this is determined using the ordering generated). The value of distance constraint is calculated such that if value is decreased below the calculated value, the wall thickness violation or illegal intersection starts occurring between the two elements. This is the minimum distance which must be maintained between the two elements.

6. Execute step 2.

Next, distance constraints are propagated transitively in the constructed DAG. From the resulting DAG, a fixed coordinate value is assigned to every BP. This process works for one direction at a time. It is repeated for all three X, Y and Z directions. Once this is accomplished, the actual edge-to-edge of each face spanning the complete collection of cavities in all three directions is obtained. Since between each pair of elements the distance constraint corresponds to minimum possible distance, therefore the computed dimensions of the manifold block, is the minimum span in each co-ordinate. This technique results in minimum volume of the manifold. This volume minimization is a critical, successful technique for design optimization.

Figure 19A:
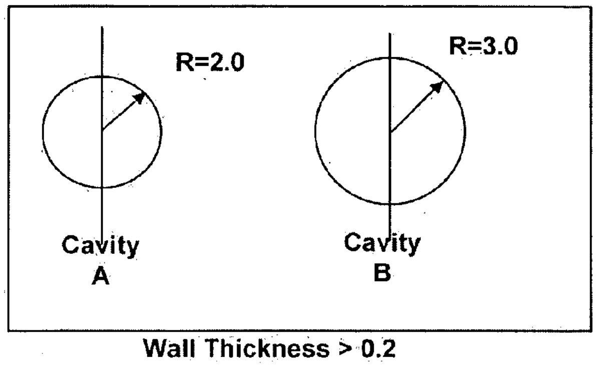
FIG. 19A-D are pictorial representations depicting the operation of the DAG in the Manifold Substantiation Module.

The implementation of DAG is shown using a simplified two-cavity, single-face representation of a manifold. FIG. 19A represents a simplified representation of the input to the DAG construction procedure.

Figure 19B:
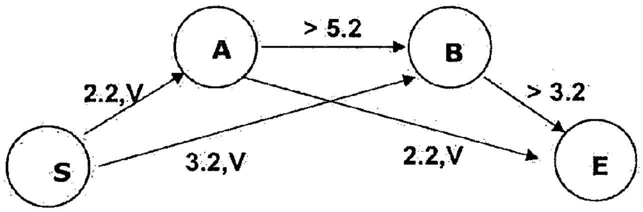

FIG. 19B shows the constructed DAG using the ordering, connectivity information (which in this example is unconnected) and geometric information (diameters) of the simplified representation of the cavity. The DAG is shown for the horizontal direction.

The value of directed arc from

S to A and A to E is equal to sum of radii of cavity A and wall thickness.

S to B and B to E is equal to sum of radii of cavity A and wall thickness.

A to B is equal to sum of radius of cavity A, radius of cavity B and wall thickness.

Figure 19C:
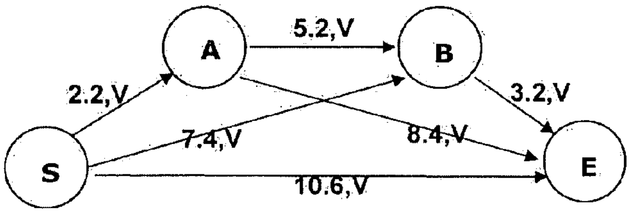

FIG. 19C shows the DAG after applying Transitive closure.

Figure 19D:
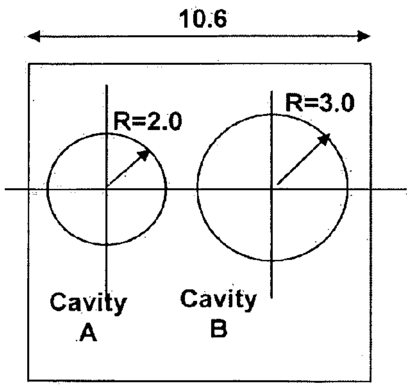

FIG. 19D shows the manifold, compacted in the horizontal direction, along which DAG has been constructed.

Rectification module: The rectification module runs immediately after the manifold substantiation module, if required. It acts to remove all the illegal intersections in the manifold by adding extra cross-drills.

The Manifold Substantiation Module communicates with the Rectification Module about any illegal intersections. It communicates which two cavities have an invalid intersection. The process of generating feasible ordering is responsible for this identification.

The ordering generation algorithm works as follows.

Construct three Upper Triangular Matrices, one each for the X, Y and Z directions. The size of matrix is equal to number of cavities in the EMT. Each cell of the matrix initially contains all three possible relations—less than (<), greater than (>), and equal to (=) where each relation describes the relative ordering of the Bottom Point (BP) of the cavities along the direction considered. The three matrices initially represent all possible ordering combinations.

1. From the connectivity matrix first find those cavities which are connected to each other. Enforcing the ordering relation between those cavity will reduce the multiple ordering (</>/=) present in cells.

2. Propagate the relationships using the Transitive Closure Algorithm.

3. If each cell of the three matrices contains a single value, then exit.

4. If not, reduce multi-relation option in one cell, to a single valued relation.

5. Propagate all the relations using the Transitive closure Algorithm.

6. Check whether the current ordering matrix is in accordance with the connectivity matrix or not. If in accordance with connectivity matrix, then go to step 5. If not, consider a different relation option from the same cell and go to step 5. If no additional relation option is available, then exit the recursive process, passing the two cavities of illegal intersection to the Rectification Module.

Table 2 shows how the individual relations between two cavities AB and BC can be used to derive a relation between cavity A and Cavity C, and repeated implemention of this logic across all cavities present in the EMT results in a progressive propagation of the Transitive Closure Algorithm, to determine a consistent ordering relation between all elements of the matrix.

TABLE 2

| AB | BC | AC |
|---|---|---|
| < | < | < |
| < | = | < |
| < | > | </=/> |
| = | < | < |
| = | = | = |
| = | > | > |
| > | < | </=/> |
| > | = | > |
| > | > | > |

Illegal intersections can occur as shown in FIG. 15(*a*). In FIG. 15(*a*) cross-drill X1 is connecting with the bottom ports of cavities A and C, but in making that connection, it is inadvertently intersecting the bottom port of primary cavity B as well, which is not a specified connection. This topology is represented with the orientation and connectivity matrix in FIG. 15(*c*). One way to remove this undesired intersection is to move cavity B away from the path of X1. In some conditions when cavity B is compelled to remain where it is by its connections with some other cavities (not shown in FIG. 15), it is not possible to move cavity B. In such conditions, cross-drill X1 must shift into some other plane such that it can side-step cavity B. In this case, rectification module drags the offending cross-drill out of way and adds extra cross-drills (X2 and X3 in FIG. 15(*b*)) needed to complete all legal connections. The topology obtained after rectification is shown in FIG. 15(*d*). As can be seen in FIG. 15(*d*), new rows and columns for cross-drills X2 and X3 have been added to the two matrices and appropriate orientation and connectivity information has been filled in each of the new cells.

During every run of the manifold substantiation module, if an illegal intersection is encountered, then the rectification module is called to remove it. It occurs repeatedly until the whole manifold is completed.

The above description of modules along with FIG. 8 completes the description of the invention.

Operation of Invention

Figure 16:
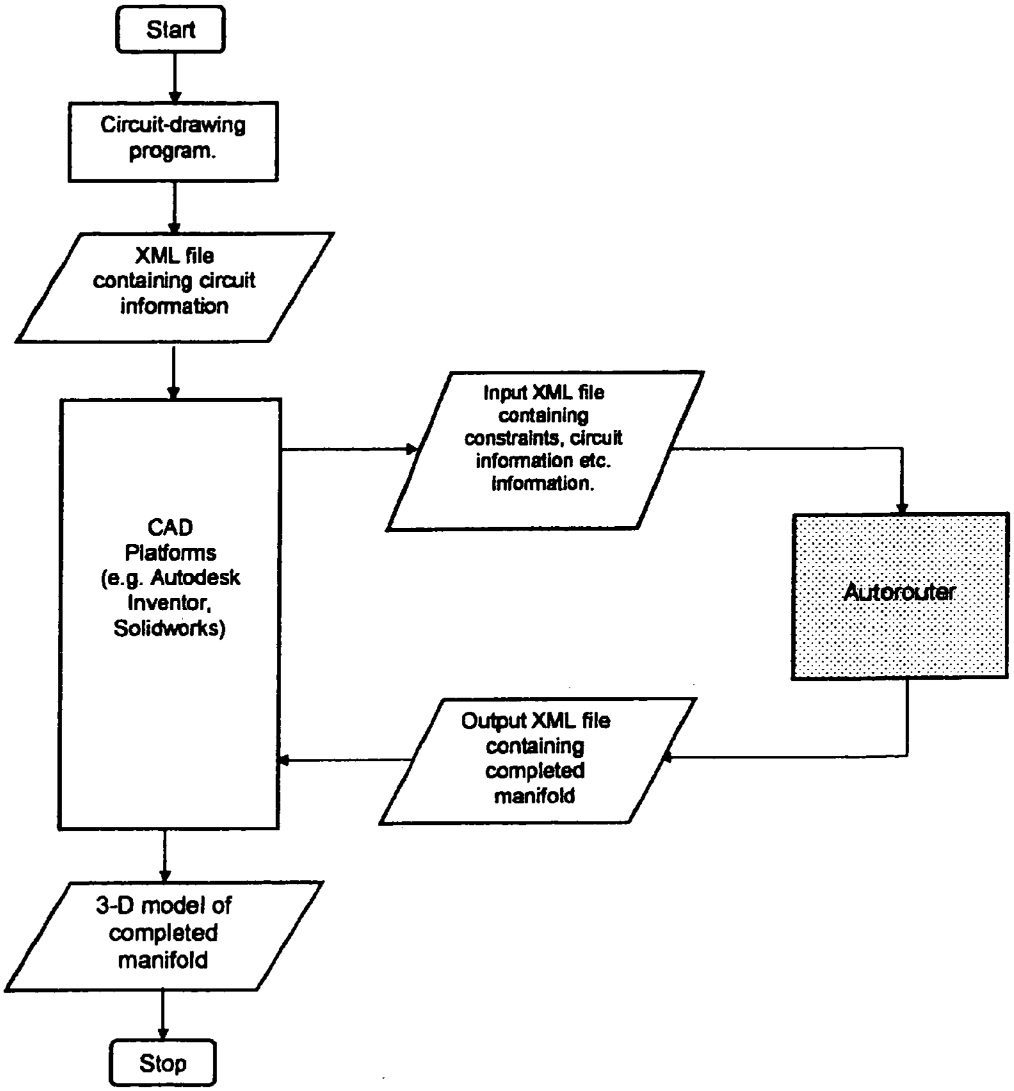
FIG. 16 represents a flow-chart of general method operation.
Figure 17:
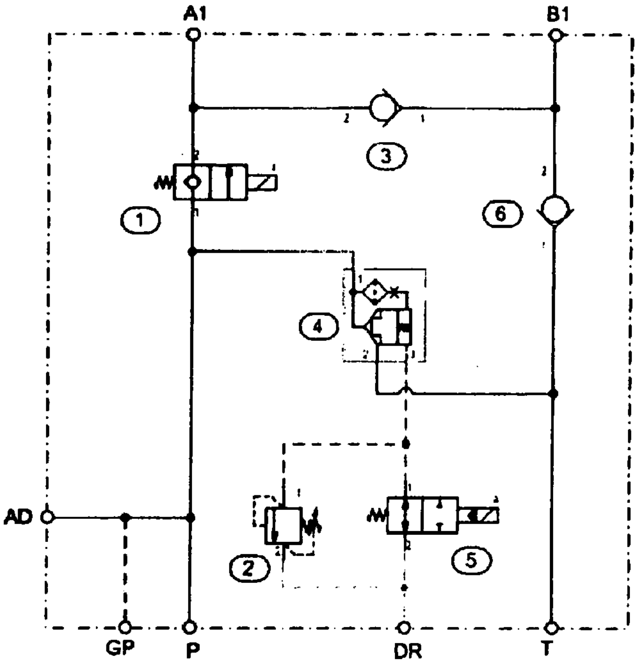
FIG. 17 is a schematic diagram of a hydraulic circuit on which a manifold is to be designed.

There can be a number of different ways to implement the above described design automation technology as a computer program. One such possible implementation and how it works is described below:

The program (termed Autorouter, by example, in the rest of the text) is designed to plug into any of the existing, standard CAD programs with an aim of ease of use over multiple platforms. A flow chart of the operation of Autorouter is shown in FIG. 16 and a description of the same follows:

First, the user who wishes to automate his manifold design creates a parametric hydraulic circuit FIG. 17 and embeds constraints and preferences, using a parametric circuit drawing software package. This circuit, and its associated constraints and preferences, is then exported in the form of an XML file.

The XML file is opened into a CAD software application like Autodesk Inventor.

This XML file serves as input for the Autorouter program. Using the methods described earlier in this text, Autorouter creates an optimum manifold and exports it in a file with XML format.

Figure 18:
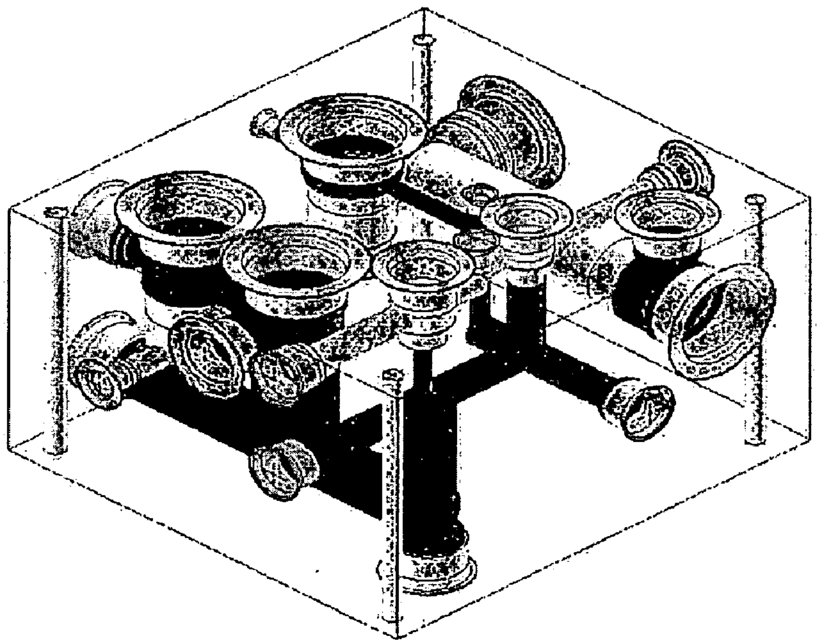
FIG. 18 represents an isometric view of a finished manifold created using the method.

This file is retrieved by the CAD program and, based on it, a 3-D model of the completed manifold is generated as shown in FIG. 18.

Illegal intersections can occur as shown in FIG. 15(*a*). In FIG. 15(*a*) cross-drill X1 is connecting with the bottom ports of cavities A and C, but in making that connection, it is inadvertently intersecting the bottom port of primary cavity B as well, which is not a specified connection. This topology is represented with the orientation and connectivity matrix in FIG. 15(*c*). One way to remove this undesired intersection is to move cavity B away from the path of X1. In some conditions when cavity B is compelled to remain where it is by its connections with some other cavities (not shown in FIG. 15), it is not possible to move cavity B. In such conditions, cross-drill X1 must shift into some other plane such that it can side-step cavity B. In this case, rectification module drags the offending cross-drill out of way and adds extra cross-drills (X2 and X3 in FIG. 15(*b*)) needed to complete all legal connections. The topology obtained after rectification is shown in FIG. 15(*d*). As can be seen in FIG. 15(*d*), new rows and columns for cross-drills X2 and X3 have been added to the two matrix and appropriate orientation and connectivity information has been filled in each of the new cells.

During every run of the manifold substantiation module, if an illegal intersection is encountered, then the rectification module is called to remove it. It occurs repeatedly until the whole manifold is completed.

The above description of modules along with FIG. 8 completes the description of the invention.

Operation of Invention

There can be a number of different ways to implement the above described design automation technology as a computer program. One such possible implementation and how it works is described below:

The program (termed Autorouter, by example, in the rest of the text) is designed to plug into any of the existing, standard CAD programs with an aim of ease of use over multiple platforms. A flow chart of the operation of Autorouter is shown in FIG. 16 and a description of the same follows:

First, the user who wishes to automate his manifold design creates a parametric hydraulic circuit (FIG. 17) and embeds constraints and preferences, using a parametric circuit drawing software package. This circuit, and its associated constraints and preferences, is then exported in the form of a file, such as an XML file by example only.

The XML file is opened into a CAD software application, such as Autodesk Inventor, for example.

This XML file serves as input for the Autorouter program. Using the methods described earlier. Autorouter creates an optimum manifold and exports it in a file with XML format, again by way of example.

This file is retrieved by the CAD program and, based on it, a 3-D model of the completed manifold is generated as shown in FIG. (18).

What is claimed is:

1. A computer implemented method for automatically designing a hydraulic manifold from a hydraulic circuit, cavity geometry and manifold design parameters, the method comprising the steps of:

storing in a memory of a computer design patterns defining optimum orientation, connections and physical structure between a plurality of cavities and cavity manifold arrangements of all possible ways to connect all orientations of any two cavities;

fetching from the memory of the computer a design pattern corresponding to a first pair of two cavities from the hydraulic circuit;

removing, using the computer, any conflicts in the design pattern between the two cavities of the first pair;

merging, using the computer, all of the remaining cavities from the hydraulic circuit, one at a time, into an evolving manifold topology;

allocating, using the computer, a manifold face for each cavity;

substantiating, using the computer, the manifold design; and saving the manifold design in a file in the computer.

2. The method of claim 1 wherein the step of storing the design patterns further comprises the step of:

storing orientation information for all of the cavities and between all of the cavities in each design pattern.

3. The method of claim 2 wherein the step of storing orientation information further comprises the steps of:

storing orientation relations between two primary cavities;

storing orientation relations of all cross-drills required to create required connections between the two primary cavities; and storing orientation information for each of the cross-drills with respect to each of the two primary cavities.

4. The method of claim 2 wherein the step of storing design patterns further comprises the steps of:

storing connectivity information for each of the cavities; and storing data on actual physical structure of each of the cavities in each pattern, including all cross-drills.

5. The method of claim 1 wherein the step of removing conflicts further comprises the step of:

removing a conflict among any three cavities where an orientation relation between any two of the three cavities cannot be realized.

6. The method of claim 1 wherein the step of merging all of the remaining cavities from the hydraulic circuit, one at a time, into an evolving manifold topology, comprises the step of:

merging an orientation matrix and a connectivity matrix for a new design pattern with the orientation matrix and the connectivity matrix of the evolving manifold topology.

7. The method of claim 6 further comprising the step of:

implementing a relations stripping process to strip away orientation and connection values incompatible with the orientation and connection values in the rest of the evolving manifold topology.

8. The method of claim 1 wherein the step of substantiating the manifold design further comprises the step of:

establishing two attributes for each cavity, including an exact location of each cavity on one face of the manifold and its depth to a bottommost point from the surface of the one face on which it is placed.

9. The method of claim 8 further comprising the step of:

validating a feasible ordering of the bottommost points of all cavities along X, Y and Z directions through a transitive closure algorithm.

10. The method of claim 9 further compromising the step of:

inserting a minimum wall thickness between every two adjacent cavities and cross-drills.

11. The method of claim 10 wherein the step of inserting the minimum wall thickness further comprises the step of:

constructing a directed acyclic graph in which nodes represent the bottommost points of all cavities and directed edges represent a distance constraint between the bottommost points, and the directed acyclic graph assigns a fixed coordinate value to the bottommost point of each cavity.

12. The method of claim 1 further comprising the step of:

exporting the manifold design in a file to a CAD program for generation of a 3-D model of the manifold.

13. The method of claim 1 further comprising the step of:

exporting the manifold design in a file.

14. The method of claim 13, wherein the file is used in a program for generation of a model of the manifold.

15. A computer-readable medium storing computer-executable instructions that, when executed on a computer, perform a method for automatically designing a hydraulic manifold from a hydraulic circuit, cavity geometry and manifold design parameters, the medium comprising instructions for:

storing in a memory of a computer design patterns defining optimum orientation, connections and physical structure between a plurality of cavities and cavity manifold arrangements of all possible ways to connect all orientations of any two cavities;

fetching from the memory of the computer a design pattern corresponding to a first pair of two cavities from the hydraulic circuit;

removing any conflicts between the two cavities in the design pattern;

merging all of the remaining cavities from the hydraulic circuit, one at a time, into an evolving manifold topology;

allocating a manifold face for each cavity;

substantiating the manifold design; and saving the manifold design in a file in the computer.

* * * * *